(12) United States Patent
Robinson et al.

(10) Patent No.: US 6,494,402 B2
(45) Date of Patent: Dec. 17, 2002

(54) LATERAL EXHAUST MICROTHRUSTER

(75) Inventors: Ernest Y. Robinson, Altadena, CA (US); Margaret H. Abraham, Los Angeles, CA (US); Peter D. Fuqua, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/855,005

(22) Filed: May 14, 2001

(65) Prior Publication Data

US 2002/0166922 A1 Nov. 14, 2002

(51) Int. Cl.$^7$ .................................. B64G 1/26
(52) U.S. Cl. ...................... 244/52; 244/169; 244/172; 60/223
(58) Field of Search .................. 244/169, 52, 172, 244/73 R; 60/39.12, 39.46 G, 223, 224, 258, 259

(56) References Cited

U.S. PATENT DOCUMENTS

| 2,890,843 | A | * | 6/1959 | Attinello ..................... 244/207 |
| 2,965,334 | A | * | 12/1960 | McCullough, Jr. et al. . 244/169 |
| 3,091,081 | A | * | 5/1963 | Alper et al. ................ 244/3.22 |
| 3,262,272 | A | * | 7/1966 | Barakauskas et al. ...... 60/39.05 |
| 4,345,729 | A | * | 8/1982 | Barter ........................ 244/169 |
| 4,384,690 | A | * | 5/1983 | Brodersen .................. 244/3.22 |
| 5,661,970 | A | * | 9/1997 | Muller et al. ................. 60/259 |

* cited by examiner

Primary Examiner—Galen L. Barefoot
(74) Attorney, Agent, or Firm—Derrick Michael Reid

(57) ABSTRACT

A microthruster having an inverted exhaust system traps burst diaphragm fragments providing a clean exhaust while an exhaust port provides increased back pressure for efficient combustion of a propellant charge in a fuel cell. A converging diverging micronozzle provides a predictable exhaust vector for improved microthrusting well suited for propulsion system on small spacecraft.

11 Claims, 1 Drawing Sheet

UNIGNITED MICROTHRUSTER CELL

EXPLODING MICROTHRUSTER

UNIGNITED MICROTHRUSTER CELL

EXPLODING MICROTHRUSTER

LATERAL EXHAUST MICROTHRUSTER

REFERENCE TO RELATED APPLICATION

The present application is related to assignee's copending application entitled "Addressable Diode Isolated Thin Film Array" Ser. No. 09/660,136 filed Sep. 12, 2000 and "Diode Isolated Thin Film Array Addressing Method" Ser. No. 09/660,135 filed Sep. 12, 2000.

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of micropropulsion systems and thrusters. More particularly, the invention relates to a microthruster having an encapsulated combustible fuel cell and an exhaust plenum for collecting debris during combustion of the fuel cell.

BACKGROUND OF THE INVENTION

Propulsion systems have long been used in spacecraft. U.S. Pat. No. 4,840,024 issued Jun. 6, 1989 discloses a propulsion system, U.S. Pat. No. 5,924,278 issued Jul. 7, 1999 discloses a insulating nozzle thruster system, U.S. Pat. No. 4,318,028 discloses a gas nozzle thruster system. The advent of miniature satellites depends on the development of suitable micropropulsion systems. Solid propellant digital thrusters are currently under development. A pyrotechnic fuel charge is set off by a circuit at the bottom surface of the fuel charge. Solid propellants require elevated pressure for efficient and complete combustion. If such pressure is not built up and sustained during the burn, the resultant thrust is erratic, fragments of propellant as well as burst diaphragm are expelled randomly outward. Conventional solid rocket motors are designed to create a pressure increase upon ignition, and to expand the pressurized combustion gases through a converging diverging nozzle, to efficiently extract thrust from the propellant.

Microthruster propulsion systems have used combustible fuel cells that are selectively fired for propelling a spacecraft. The microthruster has an exhaust aligned in a single firing line directly from the fuel cells. The combustible fuel cells are covered with a fuel cap that is exploded outward thus ejecting uncontrolled debris in a single exhaust line directly away from the microthruster and the spacecraft. One problem associated with microthrusters is the exhaust of debris that provides variable microthrusting force vectors leading to an inability to accurately predict the force vector applied when firing a fuel cell. Another problem with the microthruster is the that the expelled debris may collect on sensitive spacecraft monitoring equipment and solar power collection systems thus disadvantageously contaminating spacecraft systems during a space mission. Previous designs of impulsive microthrusters include a reduced thickness section that bursts upon ignition of the charge or fuel cell by an ignition circuit. The ignition circuit is placed on the surface of the cell in an array of microthrusters each one individually addressable. The expulsion of propellant diaphragm debris fragments is caused by the back pressure at the ignition surface. The microthruster lacks a combustion chamber and can not provide increase controlled pressure for complete combustion. Consequently, the propellant is not completely burned, the burn conditions are variable and uncontrolled, and the debris and thrust vectors are erratic. These and other disadvantages are solved or reduced using the invention.

SUMMARY OF THE INVENTION

An object of the invention is to provide a microthruster with a clean exhaust.

Another object of the invention is to provide a microthruster with a predictable exhaust force vector when firing a combustible fuel cell.

Yet another object of the invention is to provide a microthruster with a combustible fuel in combination with a debris plenum for collecting debris remains during firing of the combustible cell for providing a clean exhaust and a predictable exhaust force vector.

A further object of the invention is to provide a microthruster with increase thrusting force by increasing combustion pressure.

Still a further object of the invention is to provide a microthruster with increased thrusting forces by increasing combustion pressure using a bent exhaust system.

The invention is directed to a microthruster having a combustible fuel cell coupled to a debris plenum surrounding an exhaust stream for collecting debris during firing of the combustible fuel so as to reduce the debris from the exhaust. The fuel cell is fired from an inverted side having a burst diaphragm that serves to encapsulate and ignite the combustible fuel cell. Upon firing, the diaphragm is exploded ejecting debris in an inverted direction and through a plenum serving to collect the debris. The exhaust is communicated through the exhaust system, including the plenum, serving to further increase the pressure within the combusting cell for increased exhaust thrust.

The solid propellant microthruster includes a propellant charge or fuel cell that is ignited by an ignition circuit. This ignition leads to the reduced likelihood of expelling propellant fragments, and improved burn area characteristics for more efficient combustion. The ignition circuit is mounted on a thin diaphragm that bursts upon ignition. The burst fragments are trapped in the plenum that allows combustion to progress and pressure to build up. The exhaust flow becomes lateral through one or more lateral ports and then the exhaust flow enters the converging diverging nozzle, and then the exhaust is finally expelled at the top surface of the microthruster with an appropriate expansion ratio and well defined thrust vector. A preferred folded flow design traps physical fragments of the burst diaphragm. A micromachined converging diverging micronozzle is achieved by specialized microprocessing to efficiently convert the pressure to flow and thrust. The exhaust flow path prevents expulsion of burst diaphragm fragments and flow is preferably passed through a micronozzle having a converging diverging profile for improved thrust efficiency. The thrust impulse is consistent in magnitude and direction and efficiently converts propellant energy to thrust.

The microthruster is suitable for replication during mass production for cost reduction. The microthruster design provides for ignition on a downstream surface of the propellant grain as in conventional solid motors. The microthruster controls the combustion pressure and achieves efficient combustion while being suitable for micromachining processes and materials during manufacturing. The microthruster is suitable for spacecraft microthrusting applications and for compact miniature gas generation systems for new generation inflatable space structures. The microthruster that

DETAILED DESCRIPTION OF THE PREFERRED EMBODIMENT

Figure 1:
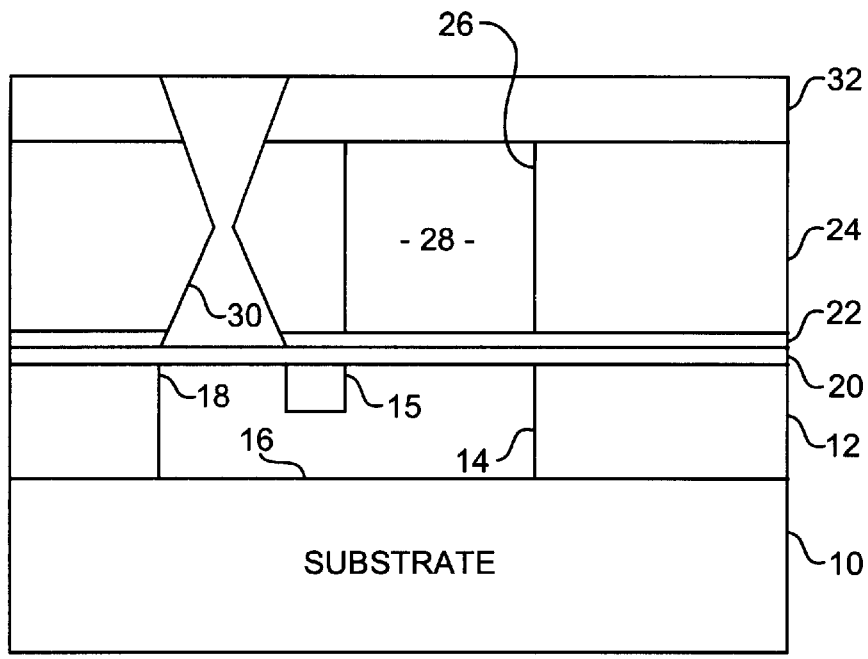
FIG. 1 is a side view of a microthruster having an unignited combustible fuel cell.
Figure 2:
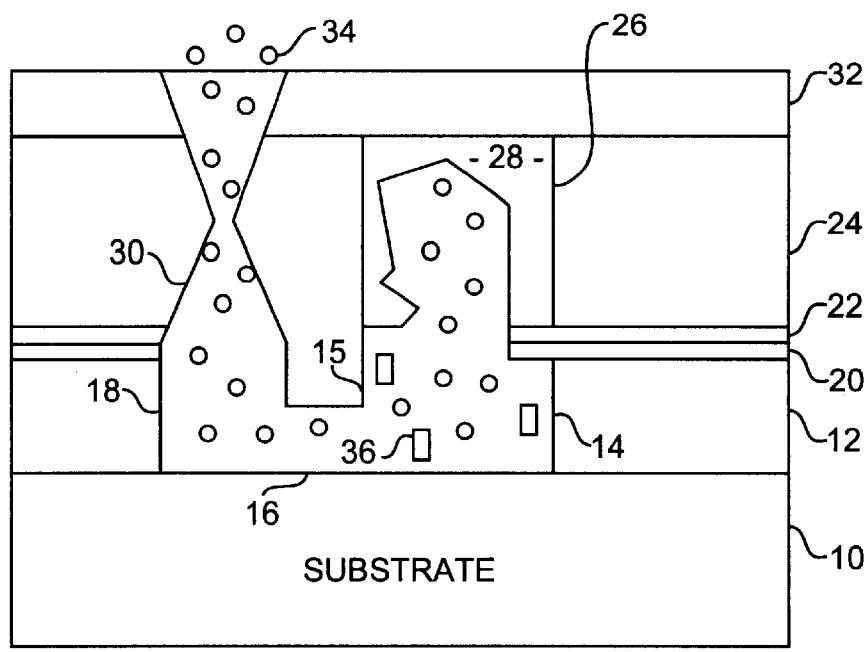
FIG. 2 is a side view of the microthruster having an exploding combustible fuel cell.

An embodiment of the invention is described with reference to the figures using reference designations as shown in the figures. Referring to the Figures, a microthruster is manufactured using semiconductor type processes starting with a substrate on which is deposited an exhaust plate that forms a lateral exhaust system including an exhaust plenum 14, a preferred protrusion 15, an exhaust port 16, and including a preferred exhaust chamber 18. The protrusion 15 serves to form, define, and separate the exhaust plenum 14, lateral exhaust port 16, and exhaust chamber 18. A burst diaphragm 20 seals the exhaust plenum 14 and preferably extends to also cover the exhaust chamber 18. An ignition circuit 22 is disposed over the burst diaphragm 20. A cell plate 24 including a fuel cell 26 containing a propellant charge 28 is deposited over the ignition circuit 22. The exhaust system preferably includes an exhaust nozzle 30 extending from a portion of the burst diaphragm 20 covering the exhaust chamber 18 through a covering layer 32 for channel exhaust 34 out of the microthruster. The covering layer 32 serves to contain the propellant charge 28 in the fuel cell 26 prior to and during ignition and combustion of the propellant charge 28 in the fuel cell 26. During combustion, the exhaust plenum 14 serves to trap exhaust debris 36 that may be, for example, burst diaphragm fragments 36 resulting from igniting the propellant charge that ruptures the burst diaphragm during fuel cell combustion.

The microthruster is fabricated using conventional fabrication and micromachining methods and materials of the electronic semiconductor industry, to enable replicate and mass production. While the Figures depict a single microthruster, it should be apparent that a plurality of such microthrusters can be replicated and arrayed upon the substrate 10 with the ignition circuit 22 being part of a respective plurality of addressable ignition circuits formed in a respective array, and that the array of microthrusters can be made as part of an overall microthrusting propulsion system well suited for small spacecraft applications. The propellant charge 28 is ignited by circuit 22 that is preferably an exploding wire or a resistive heat element for creating a localized hot spot under and proximal to the propellant charge 28 for efficient ignition of the propellant charge 28.

The microthruster exhaust system controls the combustion pressure and achieving efficient combustion. The exhaust system firstly extends downward from the fuel cell 26 into the exhaust plenum 14 where the folded exhaust flow design traps physical fragments 36 of the burst diaphragm 20 by virtue of the exhaust protrusion 15 defining the exhaust plenum 14. The exhaust protrusion 15 forming the lateral exhaust port 16 further serves to increase the back pressure in the fuel cell 26 for efficient combusting of the propellant charge 28. The exhaust chamber 18 serves to provide an upward exhaust flow into the exhaust nozzle 30. Hence, the exhaust system has an exhaust flow that is first downward through the plenum 14, lateral through the exhaust port 16 and upwardly through the exhaust chamber 18, so as to provide an inverted exhaust system that also exhausts through the covering layer 32 of the microthruster.

The micromachined converging diverging micronozzle 30 efficiently converts the pressure flow into a thrust vector extending orthogonally from the covering layer. The covering layer 32 can be exceedingly thick to secure the propellant charge 28 in the fuel cell for safety and to insure that the burst diaphragm 20, and not the covering layer 32, is exploded during ignition of the propellant charge 28. The inverted exhaust flow path prevents expulsion of burst diaphragm fragments so as to clean the exhaust gas flow 34 and improve the predictability of the thrust vector. The exhaust gas flow 34 passes through the micronozzle 30 having a converging and diverging profile for improved thrust efficiency. The resulting thrust impulse of the exhaust gas 34 is consistent in magnitude and direction while the exhaust system more efficiently converts propellant energy to thrust.

The microthruster exhaust system serves to prevent the expulsion of propellant fragments 36 by trapping the fragments in the exhaust plenum, so that the exhaust 34 extending from the exhaust nozzle is a clean exhaust gas flow that is predictable and can be defined within tight specifications for predictable microthrusting. The microthruster provides for ignition on the downstream surface of the propellant grain of the solid propellant charge 28 as in conventional solid motors that leads to a reduced likelihood of expelling propellant fragments, not shown, and burst diaphragm fragments 36, while providing improved burn area characteristics of the propellant charge 28 for more efficient combustion. The exhaust port 16 and exhaust chamber 18 determines and serves to increase the pressure in the fuel cell 26 during combustion for complete and efficient combustion of the propellant charge 28. Consequently, the propellant charge 28 is completely burned and the burn conditions are controlled and invariable. The exhaust system further serves to trap debris in the plenum and define controlled and predicable thrust vectors through the exhaust nozzle 30. The exhaust enters the converging diverging nozzle 30, and is then expelled at the top surface of the covering layer 32 with an appropriate expansion ratio for a well defined thrust vector.

The microthruster is well suited for microthruster applications and compact miniature gas generation systems for inflatable space structures. A microthruster can be replicated and mass produced by micromachining production methods while having broad applications in a wide variety of miniature spacecraft. The microthruster design is flexible. While the fuel cell 26 and exhaust plenum 14 are shown to be laterally coextensive and hence defining a fuel port equal to portions of the diagram and ignition circuit between the fuel cell 26 and exhaust plenum 14, the fuel cell may be configured so that the fuel cell port has a smaller diameter than the burst diaphragm for further controlling and increasing the combustion pressure of the propellant charge. The burst diaphragm fragments 36 are trapped in the exhaust plenum 14 that allows combustion to progress while pressure builds up in the fuel cell. The exhaust flow is longitudinal, then becomes lateral, and then becomes longitudinal again as the exhaust gas is expelled from the nozzle 30. While only one later port 16 is shown, more lateral ports, not shown, could be added to more particularly control the trap fragments 14 and control the combustion pressure. Many fuel cell design variations are possible. Those skilled in the art can make enhancements, improvements, and modifications to the invention, and these enhancements, improvements, and modifications may nonetheless fall within the spirit and scope of the following claims.

What is claimed is:

1. A microthruster for providing an exhaust being expelled with an exhaust vector resulting from combustion of a propellant, the microthruster comprising,
   a fuel cell for containing the propellant,
   a diaphragm for containing the propellant within the fuel cell prior to ignition of the propellant, the diaphragm bursting upon ignition of the propellant charge for creating the exhaust, and
   an exhaust system for communicating the exhaust from the fuel cell until expelled, the exhaust system communicating the exhaust in a first direction upon ignition of the propellant and communicating the exhaust in a second direction upon being expelled.

2. The microthruster of claim 1 wherein the exhaust system comprises,
   a plenum for receiving the exhaust when communicated in the first direction,
   a chamber for receiving the exhaust from the plenum when the exhaust system communicates the exhaust in the second direction.

3. The microthruster of claim 1 wherein the exhaust system comprises,
   a plenum for receiving the exhaust when communicated in the first direction,
   a port for receiving the exhaust from the plenum and communicating the exhaust in a third direction,
   a chamber for receiving the exhaust from the port when the exhaust system communicates the exhaust in the second direction.

4. The microthruster of claim 1 wherein the exhaust system comprises,
   a plenum for receiving the exhaust when communicated in the first direction,
   a port for receiving the exhaust from the plenum and communicating the exhaust in a third direction,
   a chamber for receiving the exhaust from the port when the exhaust system communicates the exhaust in the second direction, and
   a nozzle for receiving the exhaust from the chamber for expelling the exhaust.

5. The microthruster of claim 1 wherein the exhaust system comprises,
   a plenum for receiving the exhaust when communicated in the first direction, the plenum serving to collect fragments of the diaphragm when the diaphragm burst during ignition,
   a port for receiving the exhaust from the plenum and communicating the exhaust in a third direction, the port serving to trap the fragments in the plenum and serving to control a combustion pressure of the propellant charge during combustion of the propellant,
   a chamber for receiving the exhaust from the port when the exhaust system communicates the exhaust in the second direction, the chamber serving to control the exhaust pressure and serving to communicate the exhaust from the third direction to the second direction, and
   a nozzle for receiving the exhaust form the chamber for expelling the exhaust, the nozzle serving to control the exhaust vector.

6. The microthruster of claim 1 wherein the exhaust system comprises,
   a plenum for receiving the exhaust when communicated in the first direction, the plenum serving to collect fragments of the diaphragm when the diaphragm burst during ignition,
   a port for receiving the exhaust from the plenum and communicating the exhaust in a third direction, the port serving to trap the fragments in the plenum and serving to control a combustion pressure of the propellant charge during combustion of the propellant, the exhaust being a clean exhaust from the complete combustion of the propellant,
   a chamber for receiving the exhaust from the port when the exhaust system communicates the exhaust in the second direction, the chamber serving to control the exhaust pressure and serving to communicate the exhaust from the third direction to the second direction, and
   a nozzle for receiving the exhaust from the chamber for expelling the exhaust, the nozzle being a converging diverging nozzle in parallel alignment with the first and second directions, the nozzle serving to control the exhaust vector.

7. The microthruster of claim 1 further comprising,
   an ignition circuit disposed between the fuel cell and the diaphragm for igniting the propellant in the fuel cell.

8. A microthruster for providing an exhaust being expelled with an exhaust vector resulting from combustion of a propellant, the microthruster comprising,
   a fuel cell for containing the propellant,
   a diaphragm for containing the propellant within the fuel cell prior to ignition of the propellant, the diaphragm bursting upon ignition of the propellant charge creating fragments from the bursting diaphragm and for creating the exhaust,
   a plenum for receiving the exhaust when communicated in a first direction, the plenum serving to collect the fragments of the diaphragm when the diaphragm bursts during ignition of the propellant,
   a port for receiving the exhaust from the plenum and communicating the exhaust in a third direction, the port serving to trap the fragments in the plenum and serving to control the combustion pressure of the propellant charge during combustion of the propellant, the exhaust being a clean exhaust from the complete combustion of the propellant,
   a chamber for receiving the exhaust from the port when the exhaust system communicates the exhaust in a second direction, the chamber serving to control the exhaust pressure and serving to communicate the exhaust from the third direction to the second direction, and
   a nozzle for receiving the exhaust from the chamber for expelling the exhaust, the nozzle being a converging diverging nozzle in parallel alignment with the first and second directions, the nozzle serving to control the exhaust vector.

9. The microthruster of claim 8 further comprising,
   an addressable ignition circuit disposed between the fuel cell and the diaphragm for igniting the propellant in the fuel cell.

10. The microthruster of claim 8 further comprising,
    a protrusion for defining the plenum, port and chamber.

11. The microthruster of claim 8 further comprising,
    a covering layer for encapsulating the propellant in the fuel cell.

* * * * *